United States Patent
Döbler et al.

(10) Patent No.: US 6,893,689 B2
(45) Date of Patent: May 17, 2005

(54) HEAT-ABSORBENT MULTI-LAYER STRUCTURE

(75) Inventors: Martin Döbler, Düsseldorf (DE); Peter Bier, Krefeld (DE); Rüdiger Gorny, Krefeld (DE); Monika Stihler, Moers (DE)

(73) Assignee: Bayer Aktiengesellschaft, Leverkusen (DE)

(*) Notice: Subject to any disclaimer, the term of this patent is extended or adjusted under 35 U.S.C. 154(b) by 96 days.

(21) Appl. No.: 10/116,556

(22) Filed: Apr. 4, 2002

(65) Prior Publication Data

US 2003/0039821 A1 Feb. 27, 2003

(30) Foreign Application Priority Data

Apr. 10, 2001 (DE) .......................... 101 17 785

(51) Int. Cl.$^7$ .......................... B60R 13/00; B32B 27/36; B32B 9/04
(52) U.S. Cl. .......................... 428/31; 428/220; 428/332; 428/334; 428/335; 428/336; 428/412; 428/447; 428/923; 428/926
(58) Field of Search .......................... 428/31, 220, 332, 428/334, 335, 336, 412, 923, 926, 323, 339, 340, 33, 413, 446–448, 500, 502, 524

(56) References Cited

U.S. PATENT DOCUMENTS

| | | | |
|---|---|---|---|
| 4,767,571 A | 8/1988 | Suzuki et al. | 252/587 |
| 5,063,112 A | * 11/1991 | Gross et al. | 428/412 |
| 5,712,332 A | 1/1998 | Kaieda et al. | 524/88 |
| 6,096,852 A | 8/2000 | Lensvelt et al. | 528/196 |

FOREIGN PATENT DOCUMENTS

| | | |
|---|---|---|
| EP | 0 444 911 | 3/1982 |
| EP | 0 110 221 | 4/1987 |
| EP | 0 569 878 | 11/1993 |
| EP | 0 682 082 | 5/1995 |
| EP | 0 679 614 | 11/1995 |
| EP | 0 774 551 | 5/1997 |
| EP | 0 782 164 | 7/1997 |
| EP | 0 934 985 | 8/1999 |
| JP | 6-240146 | 8/1994 |
| JP | 10-77360 | 3/1998 |

OTHER PUBLICATIONS

Chem. Rev., 92, (month unavailable) 1992, pp. 1197–1226, Jürgen Fabian, Hiroyuki Nakazumi and Masaru Matsuoka, Near–Infrared Absorbing Dyes.

Patent Abstracts of Japan, vol. 018, No. 090 (M–1560), (Feb. 15, 1994) & JP 05 295967 A (Japan Carlit Co Ltd; The), (Nov. 9, 1993) Zusammenfassung.

Patent Abstracts of Japan, vol. 1998, No. 8, (Jun. 30, 1998) & JP 10 077360 A (Nippon Shokubai Co Ltd), (Mar. 24, 1998) in der Anmeldung erwahnt Zusammenfassung.

* cited by examiner

*Primary Examiner*—Sheeba Ahmed
(74) *Attorney, Agent, or Firm*—Joseph C. Gil; James R. Franks

(57) ABSTRACT

A transparent heat-absorbent multi-layer structure comprising, (A) a first layer, and (B) a second layer is described. The first layer (A) contains at least one organic infrared absorber (e.g., a phthalocyanine) and at least one ultraviolet absorber (e.g., a benzotriazole), and the second layer (B) contains at least one ultraviolet absorber and is substantially free of organic infrared absorbers. The first layer (A) is the only layer in the multi-layer structure that contains an organic infrared absorber. Also described is a method of preparing the multi-layer structure. Molded articles that may comprise the multi-layer structure of the present invention include glazings, such as automotive glazings.

20 Claims, No Drawings

HEAT-ABSORBENT MULTI-LAYER STRUCTURE

CROSS REFERENCE TO RELATED PATENT APPLICATION

The present patent application claims the right of priority under 35 U.S.C. §119 (a)–(d) of German Patent Application No. 101 17 785.2, filed Apr. 10, 2001.

FIELD OF THE INVENTION

The invention concerns a heat-absorbent multi-layer structure containing at least a first layer (A) and a second layer (B) together with its production, use and products produced from it.

BACKGROUND OF THE INVENTION

In the automotive sector and in buildings, glazing systems made from compositions containing transparent thermoplastic polymers such as polycarbonate, for example, offer many advantages over conventional glazing systems made from glass, such as greater break resistance and weight savings. In the case of automotive glazing systems, they provide greater passenger safety in the event of traffic accidents, and the weight savings reduce fuel consumption. Finally, transparent thermoplastic polymers and compositions containing transparent thermoplastic polymers provide substantially greater design freedom due to their easier moldability.

However, the high diathermancy (i.e., transmittance for IR radiation) of transparent thermoplastic polymers leads to an undesirable temperature rise inside the vehicle under the influence of sunlight. As described by Parry Moon, Journal of the Franklin Institute 230, pages 583–618 (1940), most solar energy lies within the near infrared (NIR) range between 650 and 1100 nm next to the visible range of light between 400 and 750 nm. Penetrating solar radiation is absorbed inside a vehicle, for example, and emitted as long-wave heat radiation at 5 to 15 $\mu$m. Since conventional glazing materials and transparent thermoplastic polymers in particular are not transparent in this range, the heat radiation cannot dissipate to the outside. A greenhouse effect is obtained. In order to minimise this effect, the transmission of glazing systems in the NIR should be kept as low as possible. Conventional transparent thermoplastic polymers such as e.g. polycarbonate are transparent in both the visible range and in the NIR, however. Therefore additives are needed for example that demonstrate as low as possible a transparency in the NIR with as high as possible a transparency in the visible range of the spectrum.

Infrared absorbers for this purpose, which limit this temperature rise, are described in the literature (e.g. J. Fabian, H. Nakazumi, H. Matsuoka, Chem. Rev. 92, 1197 (1992), U.S. Pat. No. 5,712,332, JP 06240146 A).

Dyes having absorption maxima in the near infrared (NIR) are known for such applications. For exterior applications, however, a high long-term light resistance against discoloration and fading is also necessary in addition to the required spectral properties.

A distinction is made between organic and inorganic NIR absorbers. Inorganic NIR absorbers conventionally display a high light stability but have the disadvantage of being insoluble in thermoplastics and therefore forming cloudy to opaque molding compositions. By contrast, organic NIR absorbers that are soluble in thermoplastics are known, but they display a lower light stability.

Thin, film-like, heat-absorbent multi-layer structures are described in JP 10-077360 A that contain both (A) a phthalocyanine infrared absorber and (B) an ultraviolet absorber. The weathering resistance of the thermal insulation layer is said to be improved by this means. According to one example, a film-like coating layer with a thickness of 0.13 mm is proposed, which contains both phthalocyanine infrared absorber and ultraviolet absorber. It is true that a coating layer of this type displays an acceptable weathering resistance in 48-hour accelerated weathering tests. For practical applications, however, weathering tests of more than 500 hours are necessary. Furthermore, the thin, film-like coating layers described in this publication display inadequate optical properties and are therefore unsuitable for use in automotive glazing.

In order to improve the weathering resistance of heat-absorbent multi-layer structures, a thin, film-like, heat-absorbent coating comprising 3 layers with a gradual reduction in phthalocyanine infrared absorber is also proposed in JP 10-077360 A. This contains an ultraviolet absorber in the top layer, which is directed towards the incident light radiation, a mixture of ultraviolet and phthalocyanine infrared absorbers in the middle layer and additional phthalocyanine infrared absorber in the bottom layer, which is directed away from the incident light radiation. The disadvantage of a multi-layer structure of this type is the expensive three-layer construction and the poor optical properties of the multi-layer structure, which is produced by lamination.

It is also generally known that certain thermoplastics can be protected by the use of UV-absorbent paints and/or coextruded layers having a high content of UV absorber. It is thus known from EP 0 110 221 A, for example, that the weather resistance of polycarbonate plastic sheets can be improved by coating them with a layer containing 3 to 15 wt. % of a UV absorber. The multi-layer systems described in this publication contain no infrared absorber.

Finally, EP 0 774 551 A describes heat filters based on inorganic pigments which display a UV-absorbent protective layer. Inorganic pigments have the disadvantage of not dissolving in thermoplastics, which means that moldings that are transparent in the visible range and display low haze are not obtained.

SUMMARY OF THE INVENTION

The object of the invention is to provide heat-absorbent multi-layer structures that with as simple and inexpensive a production method as possible display outstanding long-term weathering resistance and excellent optical properties such as transparency and gloss and can be used for the thermal insulation of transparent plastic glazing elements.

In accordance with the present invention, there is provided a transparent heat-absorbent multi-layer structure, comprising, (A) a first layer, and (B) a second layer, wherein said first layer (A) contains at least one organic infrared absorber and at least one ultraviolet absorber, said second layer (B) contains at least one ultraviolet absorber and is substantially free of organic infrared absorbers, and said first layer (A) is the only layer in the multi-layer structure that contains an organic infrared absorber.

Other than in the operating examples, or where otherwise indicated, all numbers expressing quantities of ingredients, reaction conditions, etc. used in the specification and claims are to be under stood as modified in all instance by the term "about."

DETAILED DESCRIPTION OF THE INVENTION

The heat-absorbent multi-layer structures according to the invention are characterized in that organic infrared absorber and ultraviolet absorber are introduced together into one layer (layer A, "NIR/UV layer"). The joint presence of the two additives in the same layer means that much of the sensitive organic infrared absorber is protected against UV radiation. The organic infrared absorber is also protected against decomposition by UV radiation by a further layer containing ultraviolet absorber (layer B, "UV layer"). A further special feature is that layer (A) is the only layer in the multi-layer structure according to the invention that contains organic IR absorber. Any other layers optionally contained in the multi-layer structure, such as clear coats, likewise contain no organic infrared absorber.

Since one of the functions of the UV layer (layer B) is to protect the NIR dye in layer (A) against UV radiation, it is advantageous to position layer (B) above layer (A) in the direction of incident light radiation. Starting with the side directed towards the incident light radiation, the following coating structure is therefore advantageous: layer (B)|layer (A), in particular with the proviso that layer (A) also serves as the substrate (e.g., plastic car windscreen).

It is also possible to position one or more further layers (B) below layer (A), leading for example to the following coating structure: layer (B)|layer (A)|layer (B). In this embodiment too it is advantageous for layer (A) also to serve as the substrate (e.g. plastic car windscreen). A sheet coextruded on both sides and consisting of a thermoplastic containing organic infrared absorber and UV absorber {layer (A)} with a thin UV absorber layer on each side {layer (B)} can be cited here by way of example. A sheet or injection molded part painted on both sides and consisting of a thermoplastic containing organic infrared absorber and UV absorber {layer (A)} with UV absorber in both paint films {layer (B)} is also possible.

Surprisingly it was established that an adequate improvement in long-term weathering resistance and excellent gloss and transparency values in the heat-absorbent multi-layer structure are obtained by positioning a single UV protective layer on top of the NIR/UV layer. The multi-layer structure according to the invention is characterized by a considerably improved long-term weathering resistance in comparison to the single-layer thermal insulation coating described in JP 10-077360 A. In comparison to the 3-layer thermal insulation coating described in JP 10-077360 A, the multi-layer structure according to the invention is characterized by considerably improved transparency and gloss values and by a simpler and less expensive manufacturing process. Contrary to the teaching of JP 10-077360, it was surprisingly established according to the invention that the introduction of NIR absorber into several layers for the purpose of achieving a gradual reduction of NIR absorber in the multi-layer structure is not necessary for an improvement in long-term weathering resistance. The elimination of an additional NIR layer achieved with the multi-layer structure according to the invention also leads to a substantial improvement in the transparency and gloss properties of the heat-absorbent multi-layer structure.

It was further found that it is advantageous for the individual layers of the multi-layer structure according to the invention to be constructed in a particular thickness. According to a preferred embodiment of the invention, the first layer (A) accordingly has a thickness of 2 to 8 mm, in particular 3 to 5 mm. According to a further preferred embodiment of the invention, the second layer (B) has a thickness of 1 to 100 $\mu$m. It is particularly advantageous if the second layer is formed from a thermoplastic polymer film having a thickness of 30 to 80 $\mu$m, in particular 40 to 60 $\mu$m. It is likewise possible for the second layer to be formed from a paint having a thickness of 1 to 30 $\mu$m, in particular 4 to 10 $\mu$m.

Surprisingly it was found that it is advantageous for the optical properties and for the long-term weathering resistance of the heat-absorbent multi-layer structures according to the invention for the NIR/UV layer (layer A) to be formed not as a thin, film-like coating layer as described in JP 10-077360 A but in a thickness of 0.8 to 15 mm. This was surprising because thin layers generally display better haze properties than thick layers. A multi-layer structure in which a relatively thick NIR/UV layer (layer A) of 0.8 to 15 mm is coated with a relatively thin UV protective layer (layer B) of 1 to 100 $\mu$m has proven to be particularly advantageous. Second layer (B) can be produced as a paint or as a thin polymer film, for example. Such a multi-layer structure displays excellent transparency and haze properties along with outstanding long-term weathering resistance. It has proven to be particularly advantageous both from a production point of view and in terms of specific properties for use in automotive glazing if the NIR/UV layer (layer A) and the UV layer (layer B) and optionally other layers in the multi-layer structure are formed as coextruded thermoplastic polymer layers in the appropriate thicknesses.

According to a further preferred embodiment of the invention, the multi-layer structure according to the invention also contains in addition to layers (A) and (B) at least one further transparent layer (C), which contains neither an organic infrared nor an ultraviolet absorber. Layer (C) is also referred to as a "clear coat" and serves to improve scratch resistance or to increase mechanical rigidity. The multi-layer structure according to the invention can contain one or more clear coats, e.g., 1 to 3 clear coats are preferably used, particularly preferably 1 clear coat.

The transparent layer (C) can be positioned anywhere in the multi-layer structure, e.g., above, below and/or between layers (A) and (B). A multi-layer structure with the following coating structure (starting with the side directed towards the incident light radiation) is particularly advantageous, however: layer (B)|layer (A)|layer (C) or layer (C)|layer (B)|layer (A).

There are no particular restrictions with regard to the material from which the transparent layer (C) can be made. It is generally advantageous, however, for the transparent layer (C) comprise a thermoplastic polymer and/or glass layer. Transparent thermoplastics in particular are suitable for forming the transparent layer (C). Thermoplastic homopolycarbonates, thermoplastic copolycarbonates, thermoplastic PMMA, thermoplastic PETG and mixtures thereof are particularly suitable for forming transparent layer (C). It is advantageous for the optical properties of the multi-layer structure if the same thermoplastic polymer is used in the transparent layer (C) as in the other layers. In a multi-layer structure according to the invention in which layers (A) and/or (B) comprise thermoplastic polycarbonate, for example, it is advantageous that transparent layer (C) also comprise thermoplastic polycarbonate or thermoplastic PMMA or thermoplastic PETG.

Organic infrared absorbers which are suitable for use in the multi-layer structure according to the invention are compounds displaying as high an absorption as possible between 700 and 1500 nm (near infrared=NIR). Infrared absorbers known from the literature, such as are described by material group in M. Matsuoka, Infrared Absorbing Dyes, Plenum Press, New York, 1990, for example, are suitable. Infrared absorbers from the material groups of phthalocyanines, naphthalocyanines, metal complexes, azo dyes, anthraquinones, quadratic acid derivatives, immonium dyes, perylenes, quarterylenes and polymethines are particularly suitable. Of these, phthalocyanines and naphthalocyanines are most particularly suitable. Phthalocyanines and naphthalocyanines having bulky side groups are preferable because of their improved solubility in thermoplastics.

There are no particular restrictions with regard to the amount of organic infrared absorber contained in layer (A), provided that the desired absorption of heat radiation and an adequate transparency of the multi-layer structure is ensured. It has proven to be particularly advantageous if layer (A) contains organic infrared absorber in a quantity of 0.001 to 10 g/m$^2$, in particular 0.1 to 1 g/m$^2$. Depending on the absorbance coefficient and film thickness of the NIR/UV layer (layer A), the infrared absorber is preferably used in concentrations of between 1 and 10,000 ppm, preferably between 10 and 1,000 ppm, and most particularly preferably between 20 and 400 ppm. Mixtures of infrared absorbers are also particularly suitable. The person skilled in the art can achieve an optimisation of absorption in the near infrared range with dyes having absorption maxima at varying wavelengths.

Suitable ultraviolet absorbers for use in the multi-layer structure according to the invention are compounds having as low as possible a transmission below 400 nm and as high as possible a transmission above 400 nm. Such compounds and their manufacture are known from the literature and are described for example in EP 0 839 623 A, WO 96/15102 and EP 0 500 496 A. Particularly suitable ultraviolet absorbers far use in the multi-layer structure according to the invention are benzotriazoles, triazines, benzophenones and/or arylated cyanoacrylates.

Particularly suitable ultraviolet absorbers are hydroxy benzotriazoles, such as 2-(3',5'-bis(1,1-dimethylbenzyl)-2'-hydroxyphenyl) benzotriazole (Tinuvin® 234, Ciba Spezialitätenchemie, Basle), 2-(2'-hydroxy-5'-(tert-octyl) phenyl) benzotriazole (Tinuvine® 329, Ciba Spezialitätenchemie, Basle), 2-(2'-hydroxy-3'-(2-butyl)-5'-(tert-butyl) phenyl) benzotriazole (Tinuvin® 350, Ciba Spezialitätenchemie, Basle), bis(3-(2H-benzotriazolyl)-2-hydroxy-5-tert-octyl) methane (Tinuvin® 360, Ciba Spezialitätenchemie, Basle), 2-(hydroxy-2-hydroxyphenyl)-4,6-diphenyl-1,3,5-triazine (Tinuvin® 1577, Ciba Spezialitätenchemie, Basle), and the benzophenone 2,4-dihydroxy benzophenone (Chimasorb22®, Ciba Spezialitätenchemie, Basle), 2-propenoic acid, 2-cyano-3,3-diphenyl-, 2,2-bis[[(2-cyano-1-oxo-3,3-diphenyl-2-propenyl)oxy]methyl]-1,3-propanediyl ester (9Cl) (Uvinul® 3030, BASF AG, Ludwigshafen). Mixtures of these ultraviolet absorbers can also be used.

Nanoscale inorganic UV absorbers can also be used with or without organic UV absorbers. $TiO_2$, $ZnO$, $CeO_2$ are preferred. The size of these particles is less than 100 nm. Their manufacture is known.

There are no particular restrictions with regard to the amount of ultraviolet absorber contained in the multi-layer structure, provided that the desired absorption of UV radiation and an adequate transparency of the multi-layer structure are ensured. According to a preferred embodiment of the invention, layer (A) contains ultraviolet absorber in a quantity of 0.1 to 10%, in particular 0.2 to 1%. It has further proven to be advantageous if layer (B) contains ultraviolet absorber in a quantity of 0.1 to 40%, in particular 1 to 10%.

There are no particular restrictions with regard to the base material (e.g., the thermoplastic polymer composition or paint composition) from which layers (A) and (B) are prepared, provided that the material displays high transparency and weathering resistance and is therefore suitable for use in automotive glazing. It has proven to be particularly advantageous, however, if the individual layers of the multi-layer structure are layers based on thermoplastic polymer compositions or paint compositions. This means that the organic infrared absorbers and/or ultraviolet absorbers, if contained in the individual layers, are introduced into the thermoplastic polymer composition or paint from which the layers are prepared. Transparent thermoplastic polymers are preferably used.

Transparent thermoplastic polymers in the sense of the invention include for example, polymers of ethylenically unsaturated monomers and/or polycondensates of bifunctional reactive compounds. Examples of transparent thermoplastic polymers include, but are not limited to, homopolycarbonates or copolycarbonates based on diphenols, polyacrylates or copolyacrylates and polymethacrylates or copolymethacrylate, such as polymethyl or copolymethyl methacrylates and copolymers with styrene, such as transparent polystyrene acrylonitrile (PSAN) or polymers based on ethylene and/or propylene and aromatic polyesters such as PET, PEN or PETG and transparent thermoplastic polyurethanes. Polymers based on cyclic olefins (e.g. TOPAS®, a commercial product from Ticona), polycondensates or copolycondensates of terephthalic acid, such as polyethylene or copolyethylene terephthalates (PET or CoPET) or PETG can also be incorporated. Mixtures of several transparent thermoplastic polymers are also possible.

Homopolycarbonates or copolycarbonates are preferred.

Particularly preferred polycarbonates are the homopolycarbonate based on bisphenol A, the homopolycarbonate based on 1,3-bis(4-hydroxyphenyl)-3,3,5-trimethyl cyclohexane and the copolycarbonates based on the two monomers bisphenol A and 1,1-bis(4-hydroxyphenyl)-3,3,5-trimethyl cyclohexane.

Polycarbonates in the sense of the present invention include both homopolycarbonates and copolycarbonates; the polycarbonates can be linear or branched by known means.

The polycarbonates are produced by known means from diphenols, carbonic acid derivatives, optionally chain terminators and branching agents.

Details of the production of polycarbonates have been set down in many patent specifications over some 40 years. Reference is made here by way of example only to Schnell, "Chemistry and Physics of Polycarbonates", Polymer Reviews, Volume 9, Interscience Publishers, New York, London, Sydney 1964, to D. Freitag, U. Grigo, P. R. Müller, H. Nouvertne', BAYER AG, "Polycarbonates" in Encyclopedia of Polymer Science and Engineering, Volume 11, second edition, 1988, pages 648–718, and finally to Drs U. Grigo, K. Kirchner and P. R. Müller "Polycarbonate" in Becker/Braun, Kunststoff-Handbuch, Volume 3/1, Polycarbonate, Polyacetale, Polyester, Celluloseester, Carl Hanser Verlag Munich, Vienna 1992, pages 117–299.

Examples of suitable diphenols for production of the polycarbonates include hydroquinone, resorcinol, dihydroxydiphenyls, bis(hydroxyphenyl) alkanes, bis(hydroxyphenyl) cycloalkanes, bis(hydroxyphenyl) sulfides, bis(hydroxyphenyl) ethers, bis(hydroxyphenyl) ketones, bis(hydroxyphenyl) sulfones, bis(hydroxyphenyl) sulfoxides, α,α'-bis(hydroxyphenyl) diisopropyl benzenes, and ring-alkylated and ring-halogenated compounds thereof.

Preferred diphenols are 4,4'-dihydroxydiphenyl, 2,3-bis(4-hydroxyphenyl) propane, 2,4-bis(4-hydroxyphenyl)-2-methylbutane, 1,1-bis(4-hydroxyphenyl)-p-diisopropyl benzene, 2,2-bis(3-methyl-4-hydroxyphenyl) propane, 2,2-bis(3-chloro-4-hydroxyphenyl) propane, bis(3,5-dimethyl-4-hydroxyphenyl) methane, 2,2-bis(3,5-dimethyl-4-hydroxyphenyl) propane, bis(3,5-dimethyl-4-hydroxyphenyl) sulfone, 2,4-bis(3,5-dimethyl-4-hydroxyphenyl)-2-methyl butane, 1,1-bis(3,5-dimethyl-4-hydroxyphenyl)-p-diisopropyl benzene, 2,2-bis(3,5-dichloro-4-hydroxyphenyl) propane, 2,2-bis(3,5-dibromo-4-hydroxyphenyl) propane and 1,1-bis(4-hydroxyphenyl)-3,3,5-trimethyl cyclohexane.

Particularly preferred diphenols are 2,2-bis(4-hydroxyphenyl) propane, 2,2-bis(3,5-dimethyl-4-hydroxyphenyl) propane, 2,2-bis(3,5-dichloro-4-hydroxyphenyl) propane, 2,2-bis(3,5-dibromo-4-hydroxyphenyl) propane, 1,1-bis(4-hydroxyphenyl) cyclohexane and 1,1-bis(4-hydroxyphenyl)-3,3,5-trimethyl cyclohexane.

These and other suitable diphenols are described for example in U.S. Pat. Nos. 3,028,635, 2,999,825, 3,148,172, 2,991,273, 3,271,367, 4,982,014 and 2,999,846, in DE-A 1,570,703, DE-A 2063 050, DE-A 2 036 052, DE-A 2 211 956 and DE-A 3 832 396, in FR-A 1 561 518, in the monograph "H. Schnell, Chemistry and Physics of Polycarbonates, Interscience Publishers, New York 1964" and in JP-A 62039/1986, JP-A 62040/1986 and JP-A 105550/1986.

In the case of homopolycarbonates only one diphenol is used, in the case of copolycarbonates more than one diphenol is used.

Suitable carbonic acid derivatives include, for example, phosgene or diphenyl carbonate.

Suitable chain terminators that can be used in the production of the polycarbonates are both monophenols and monocarboxylic acids. Suitable monophenols are phenol itself, alkyl phenols such as cresols, p-tert-butyl phenol, p-n-octyl phenol, p-isooctyl phenol, p-n-nonyl phenol and p-isononyl phenol, halophenols such as p-chlorophenol, 2,4-dichlorophenol, p-bromophenol and 2,4,6-tribromophenol, 2,4,6-triiodine phenol, p-iodine phenol, and mixtures thereof.

Particularly preferred chain terminators are p-tert-butyl phenol and phenol.

Furthermore, suitable monocarboxylic acids are benzoic acid, alkyl benzoic acids and halobenzoic acids.

Preferred chain terminators are further the phenols having the formula (I)

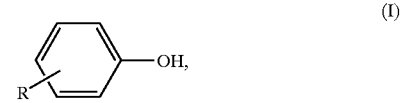

(I)

wherein
R is hydrogen or a $C_1$ to $C_{30}$ alkyl radical, linear or branched, is preferably tert.-butyl or is a branched or unbranched $C_8$ and/or $C_9$ alkyl radical.

The quantity of chain terminator to be used is preferably 0.1 to 5 mol %, relative to mols of diphenols used in each case. The chain terminators can be added before, during or after phosgenation.

Suitable branching agents are the trifunctional or higher than trifunctional compounds known in polycarbonate chemistry, particularly those having three or more than three phenolic OH groups.

Examples of suitable branching agents include phloroglucinol, 4,6-dimethyl-2,4,6-tri(4-hydroxyphenyl) heptene-2,4,6-dimethyl-2,4,6-tri(4-hydroxyphenyl) heptane, 1,3,5-tri(4-hydroxyphenyl) benzene, 1,1,1-tri(4-hydroxyphenyl) ethane, tri(4-hydroxyphenyl) phenylmethane, 2,2-bis[4,4-bis(4-hydroxyphenyl) cyclohexyl]propane, 2,4-bis(4-hydroxyphenyl isopropyl) phenol, 2,6-bis(2-hydroxy-5'-methyl benzyl)-4-methylphenol, 2-(4-hydroxyphenyl)-2-(2,4-dihydroxyphenyl) propane, hexa(4(4-hydroxyphenyl isopropyl) phenyl) orthoterephthalic acid ester, tetra(4-hydroxyphenyl) methane, tetra(4-(4-hydroxyphenyl isopropyl) phenoxy) methane and 1,4-bis(4',4"-dihydroxytriphenyl methyl) benzene as well as 2,4-dihydroxybenzoic acid, trimesic acid, cyanuric chloride and 3,3-bis(3-methyl-4-hydroxyphenyl)-2-oxo-2,3-dihydroindole.

The amount of branching agent optionally to be added is preferably 0.05 to 2 mol %, relative again to mols of diphenols used in each case.

The branching agents can either be included with the diphenols and the chain terminators in the aqueous-alkaline phase or added before phosgenation, dissolved in an organic solvent. If the interesterification method is used, the branching agents are added together with the diphenols.

The thermoplastic polymer compositions according to the invention can also contain other conventional polymer additives, such as the antioxidants and mold release agents described in EP-A 0 839 623, WO 96/15102 and EP-A 0 500 496, for example, but also flame retardants, glass fibres, fillers, foaming agents, pigments, optical brighteners or dyes known from the literature, in the conventional quantities for the relevant thermoplastics. Quantities of up to 5 wt. % are preferred, preferably 0.01 to 5 wt. %, relative to the quantity of compositions, particularly preferably 0.01 to 1 wt. %, relative to the quantity of thermoplastic polymer compositions. Mixtures of several additives are also suitable.

The contents of ions present as contamination in the thermoplastic polycarbonates are preferably less than 10 ppm, particularly preferably less than 5 ppm. The measures involved in the production of thermoplastic polycarbonates are familiar to the person skilled in the art.

If more than one thermoplastic layer is used, the thermoplastics can be different or the same.

Suitable combinations of moldings and protective layers are cited for example in EP 0 320 632 A. Similar plastics are preferably used.

Suitable paint systems (coating compositions) for use in preparing the multi-layer structure according to the invention include those whose crosslinking components (i.e., crosslinkers) have functional groups selected from acrylate, allyl, epoxy, siloxane, isocyanate, anhydride, and melamine formaldehyde groups, and combinations thereof. Crosslinkers used in coating compositions typically have at least two functional groups (e.g., 2, 3 or 4 isocyanate groups) that are capable of forming covalent bonds with other reactive groups (e.g., isocyanate groups and hydroxyl groups reacting to form urethane linkages). The formation of such covalent bonds or linkages leads to the formation of a three dimensional crosslink network. Comprehensive descriptions of such paint systems can be found in: "Lehrbuch der Lacke und Beschichtungen", editor: Dr. Hans Kittel, Verlag Hirzel, Stuttgart, 1998; in "Lackkunstharze" by Hans Wagner, Hans Friedrich Sarx, Carl Hanser Verlag Munich, 1971; specifically for epoxy resins in "Epoxy Resins, Chemistry and Technology", edited by Clayton A. May and Yoshio Tanaka, Marcel Dekker, Inc. New York, 1973, chapter 7, page 451 ff.

Siloxane paints (i.e., coating compositions that comprise siloxane functional crosslinkers) as described, for example in DE 4 020 316 A, are particularly preferred.

The thickness of the paint films is typically 1 to 200 μm, preferably 2 to 50 μm and most particularly preferably 2 to 10 μm. The viscosity of the coating composition is preferably 5 to 10,000 mPa s.

The thermoplastic polymer compositions or paint compositions used in the formation of layers (A), (B) and/or (C) can optionally contain other additives, such as antioxidants, flame retardants, fillers, foaming agents, conventional dyes and pigments, optical brighteners and nucleating agents or the like described in EP 0 839 623 A1 and EP 0 500 496 A1, preferably in quantities of up to 5 wt. % in each case, preferably 0.01 to 5 wt. %, relative to the total mixture, particularly preferably 0.01 to 1 wt. %, relative to the quantity of plastic. Mixtures of these additives are also suitable.

The thermoplastic polymer compositions used in the formation of first layer (A) can moreover also contain conventional heat stabilisers. Particularly suitable as heat stabilisers according to the invention are: hindered phenols, for example octadecyl-3-(3',5'-di-tert-butyl-4'-hydroxyphenyl) propionate (IRGANOX® 1076, Ciba Specialty Chemicals, Basle, Switzerland). Other particularly suitable heat stabilisers according to the invention are phosphites, in particular tris(2,4-di-tert-butylphenyl) phosphite (IRGAFOS® 168, Ciba Specialty Chemicals, Basle, Switzerland), or phosphines, such as triphenyl phosphine.

The thermoplastic polymers in the multi-layer structure according to the invention can also contain conventional mold release agents. Particularly suitable mold release agents are pentaerythritol tetrastearate (PETS) or glycerol monostearate (GMS).

The organic infrared absorbers, ultraviolet absorbers and other additives can be introduced into the individual layers of the multi-layer structure according to the invention by known methods such as compounding, incorporation in solution, coextrusion, kneading, incorporation by injection molding or as a masterbatch.

The multi-layer structure according to the invention can be produced by known methods such as painting (e.g., by dip coating or back spraying), coextrusion, embossing, lining, lamination, sandwich molding, application from solution, in one or more optionally different or separate steps.

The individual layers can be applied on top of one another at the same time as or immediately after molding of the basic part, e.g. by coextrusion or sandwich molding. However, they can also be applied to the final molded basic part, e.g. by lamination with a film or by coating with a solution.

The coating structure according to the invention can optionally also subsequently be formed in the thermoplastic state, by thermoforming for example.

The multi-layer structure according to the present invention can, for example, be produced by means of a method comprising:

(a) preparing a composition for the formation of the first layer (A) by mixing organic infrared absorber and ultraviolet absorber with one of a transparent thermoplastic polymer composition and a transparent paint composition;

(b) preparing a composition for the formation of the second layer (B) by mixing ultraviolet absorber with one of a transparent thermoplastic polymer composition and a transparent paint (coating) composition;

(c) forming the multi-layer structure by means of a method selected from at least one of coextruding, injection molding and spraying of the first and second layers (A) and (B), and optionally at least one transparent layer (C), wherein the optional transparent layer (C) is free of organic infrared absorber and ultraviolet absorber.

The ultraviolet and/or infrared absorber is preferably mixed with the thermoplastic polymer composition by compounding.

According to a preferred embodiment of the invention, layer (A) is produced by injection molding, layer (B) by painting (e.g., by spray application or dip-coating) and optionally other layers by injection molding or painting.

The individual layers are preferably produced by coextrusion.

In addition to solid sheets, multi-wall sheets (twin-wall sheets, triple-wall sheets, etc.) or corrugated sheets can be produced from the multi-layer structures according to the invention. They can also be used for injection molded parts such as food containers, components of electrical appliances and in spectacle lenses (e.g., ophthalmic lenses, safety goggles and welding goggles).

The multi-layer structures according to the invention can be generally used wherever diathermancy is undesirable. Their use in automotive components, such as glazing elements, car sunroofs, plastic headlamp diffusers, and architectural applications, such as glazing for buildings, greenhouse components, dome lights, bus stop structures or similar applications is particularly suitable.

The multi-layer structure according to the invention is suitable for the production of moldings, in particular for the production of transparent plastic glazing elements, such as plastic glazing elements based on homopolycarbonates and/or copolycarbonates. The invention therefore also provides moldings produced with the multi-layer structure according to the invention.

EXAMPLES

The invention is described in greater detail herein with reference to the following examples.

Example 1

To manufacture the test pieces, the polycarbonates (Makrolon® 2808 or Makrolon® DP 1265 from Bayer AG, Leverkusen) with an average molecular weight of approx. 28,000 and 20,000 respectively ($M_w$ by GPC) were compounded at 300° C. on a twin-screw extruder with the quantity of additive indicated in Table 1 and then pelletised. Colored specimens (60 mm×40 mm×2 mm) were then extruded from these pellets. Compositions R5 and 6 were extruded directly at 250° C.

The following compounds were used as IR absorbers:
IR absorber (A): vanadyl-5,14,23,32-tetraphenyl-2,3-naphthalocyanine (Aldrich, Steinheim, Germany),
IR absorber (B): copper(II)-1,4,8,11,15,18,22,25-octabutoxy-29H,31H-phthalocyanine (Aldrich, Steinheim, Germany) and
IR absorber (C): KU3-2052 (commercial two-component NIR dye from Bayer AG, Leverkusen, Germany with components A and B).

The following compounds were used as UV absorbers:
UV absorber (A): 2-(2'-hydroxy-3'-(2-butyl)-5'(tert-butyl) phenyl) benzotriazole (Tinuvin® 350 from Ciba Spezialitätenchemie, Basle, Switzerland) and
UV absorber (B): bis(3-(2H-benzotriazolyl)-2-hydroxy-5-tert-octyl) methane (Tinuvin® 360 from Ciba Spezialitätenchemie, Basle, Switzerland).

TABLE 1

Composition of the samples

| Composition | |
|---|---|
| R1 | 70 ppm IR absorber (A) in MAKROLON ® 2808 |
| 2 | 70 ppm IR absorber (A) + 0.3% UV absorber (A) in MAKROLON ® 2808 |
| R3 | 70 mg IR absorber (B) in MAKROLON ® 2808 |
| 4 | 70 mg IR absorber (B) + 0.3% UV absorber (A) in MAKROLON ® 2808 |
| R5 | IR absorber (C) (160 ppm component A + 240 ppm component B) + 0.1% paraffin oil in MAKROLON ® DPI 1265 |
| 6 | IR absorber (C) (160 ppm component A + 240 ppm component B) + 0.1% paraffin oil + 0.3% UV absorber (A) in MAKROLON ® DPI 1265 |

A 100 μm thick polycarbonate film consisting of 5% UV absorber (B) in MAKROLON® 3108 by embossing at 155° C. and 100 kN for 60 seconds was applied to the colored specimens.

Example 2

The transmission spectra for the colored specimens produced from compositions 2, 4 and 6 and reference compositions 1, 3 and 5 were measured with a "lamda 9" UV VIS-NIR spectrometer from Perkin Elmer. The samples were then weathered using Xe WOM at 0.35 W/m² (102:18) and the transmission spectra measured again.

The transmission at the absorption maximum in the NIR was measured. In the case of compositions 2 and 4 and reference compositions 1 and 3 the transmission values at a subsidiary maximum were also measured in order to obtain a better comparison of the stabilising action of the multi-layer structure according to the invention.

TABLE 2

Transmission properties of compositions 2, 4 and 6 and of reference compositions 1, 3 and 5 after 5000 h Xe WOM (Δ means T(5000)–T(0 h)).

| Wavelength | Position in spectrum | T (0 h) | T (5000 h) | Δ | T (0 h) | T (5000 h) | Δ |
|---|---|---|---|---|---|---|---|
| | | Composition R1 | | | Composition 2 | | |
| 750 nm | Subsidiary absorption maximum | 47.1% | 55.6% | 8.5% | 47.5% | 53.7% | 6.2% |
| 850 mm | Absorption maximum | 2.3% | 6.4% | 4.1% | 2.3% | 5.2% | 2.9% |

TABLE 2-continued

Transmission properties of compositions 2, 4 and 6 and of reference compositions 1, 3 and 5 after 5000 h Xe WOM (Δ means T(5000)−T(0 h)).

| Wave-length | Position in spectrum | T (0 h) | T (5000 h) | Δ | T (0 h) | T (5000 h) | Δ |
|---|---|---|---|---|---|---|---|
| | | Composition R3 | | | Composition 4 | | |
| 675 nm | Subsidiary absorption maximum | 29.4% | 38.5% | 9.1% | 31.1% | 35.2% | 4.1% |
| 755 nm | Absorption maximum | 0.7% | 2.6% | 1.9% | 0.9% | 1.7% | 0.8% |
| | | Composition R5 | | | Composition 6 | | |
| 995 nm | Absorption maximum | 2.0% | 31.0% | 19.0% | 2.3% | 18.0% | 15.7% |

As can be seen from Table 2, the transmission at the absorption maxima or secondary maxima for compositions 2, 4 and 6 according to the invention increases less sharply than is the case for the reference compositions 1, 3 and 5. This means that the NIR dyes with the aid of the multi-layer structure according to the invention (compositions 2, 4 and 6) fade less severely under weathering than those protected only by a conventional UV protective layer (reference compositions 1, 3 and 5).

Example 3

The haze on weathered and non-weathered samples was determined according to the specification ASTM D 1003 using a Haze-Gard plus instrument from BYK-Gardner GmbH, D-82538 Geretsried.

TABLE 3

Haze tests and difference Δ in haze before and after weathering at 3000 h Xe WOM

| Composition | With/without protective film | Xe WOM weathering | Haze | Δ |
|---|---|---|---|---|
| R5 | without | 0 h | 0.6 | — |
| R5 | with | 0 h | 0.9 | — |
| R5 | without | 3000 h | 28.0 | 27.4% |
| R5 | with | 2000 h | 5.8 | 4.9% |
| 6 | without | 0 h | 0.7 | — |
| 6 | with | 0 h | 1.3 | — |
| 6 | without | 3000 h | 22.0 | 21.3% |
| 6 | with | 3000 h | 5.0 | 3.7% |

Δ = difference from non-weathered sample

The measured values in Table 3 show that the UV protective layer according to the invention (composition 6 with protective film) sustains only a 3.7% increase in haze as compared with 4.9% or even 21.3% and 27.4% in the case of the reference compositions. The absolute haze is likewise lower in the case of the protective layer according to the invention after weathering.

Example 4

The gloss on weathered and non-weathered samples was determined according to DIN standard 67530.

TABLE 4

Gloss tests

| Composition | With/without protective film | Xe WOM weathering | Gloss at 20° | Gloss at 60° |
|---|---|---|---|---|
| R1 | without | 0 h | 163 | 149 |
| R1 | without | 3000 h | 99 | 112 |
| R1 | with | 5000 h | 95 | 120 |
| 2 | without | 0 h | 174 | 158 |
| 2 | without | 3000 h | 137 | 135 |
| 2 | with | 5000 h | 119 | 138 |

The measured values in Table 4 show that at 119% and 138% the multi-layer structure according to the invention (composition 2 with protective film) exhibits a higher gloss after 5000 h Xe WOM than the reference samples, which in some cases had been weathered for shorter periods.

The test results show that the multi-layer structures according to the invention with their simple construction demonstrate outstanding long-term weathering resistance under Xe WOM weathering, even after 5000 h, excellent transparency properties and outstanding gloss values.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A transparent heat-absorbent multi-layer structure, comprising:
   (A) a first layer;
   (B) a second layer; and
   (C) a third layer,
wherein
   said first layer (A) contains at least one organic infrared absorber and at least one ultraviolet absorber,
   said second layer (B) contains at least one ultraviolet absorber and is substantially free of organic infrared absorbers,
   said first layer (A) is the only layer in the multi-layer structure that contains an organic infrared absorber,
   said third layer (C) is transparent, and is free of organic infrared absorber and ultraviolet absorber, and said first layer (A) abuts said second layer (B), and said second layer (B) is interposed between said third layer (C) and said first layer (A).

2. The transparent heat-absorbent multi-layer structure of claim 1 wherein said third layer (C) comprises a thermoplastic polymer.

3. The multi-layer structure of claim 1 wherein said first layer (A) has a thickness of 0.8 to 15 mm.

4. The multi-layer structure of claim 1 wherein said second layer (B) has a thickness of 1 to 100 μm.

5. The multi-layer structure of claim 1 wherein said second layer (B) is formed as a thermoplastic polymer film having a thickness of 30 to 80 μm.

6. The multi-layer structure of claim 1 wherein said second layer (B) is formed as a paint having a thickness of 1 to 10 μm.

7. The multi-layer structure of claim 1 wherein said first layer (A) contains organic infrared absorber in an amount of 0.001 to 10 g/m$^2$.

8. The multi-layer structure of claim 1 wherein the first layer (A) contains ultraviolet absorber in an amount of 0.1 to 10%.

9. The multi-layer structure of claim 1 wherein the second layer (B) contains ultraviolet absorber in an amount of 0.1 to 40%.

10. The multi-layer structure of claim 1 wherein said first layer (A) contains organic infrared absorber in an amount of from 1 to 10,000 ppm.

11. The multi-layer structure of claim 1 wherein the organic infrared absorber is selected from the group consisting of phthalocyanines, naphthalocyanines and mixtures thereof.

12. The multi-layer structure of claim 1 wherein the ultraviolet absorber is selected from the group consisting of benzotriazoles, triazines, benzophenones, arylated cyanoacrylates and mixtures thereof.

13. The multi-layer structure of claim 1 wherein said first end second layers (A) and (B) are each independently formed from a member selected from the group consisting of a thermoplastic polymer composition and a paint composition.

14. The multi-layer structure of claim 13 wherein said thermoplastic polymer composition comprises a member selected from the group consisting of a thermoplastic homopolycarbonate a thermoplastic copolycarbonate, and combinations thereof.

15. The multi-layer structure of claim 13 wherein the paint composition comprises at least one crosslinker having functional groups selected from the group consisting of acrylate, allyl, epoxy, siloxane, isocyanate, anhydride, melamine formaldehyde groups and combinations thereof.

16. The multi-layer structure of claim 15 wherein the paint comprises a crosslinker having siloxane functional groups.

17. A molded article comprising the multi-layer structure of claim 1.

18. The molded article of claim 17 wherein said article is a transparent automotive glazing element.

19. The molded article of claim 18 wherein said automotive glazing element comprises at least one layer comprising a thermoplastic polymer selected from the group consisting of thermoplastic homopolycarbonates, thermoplastic copolycarbonates and mixtures thereof.

20. A transparent heat-absorbent multi-layer structure, comprising:

(A) a first layer;

(B) a second layer; and (C) a third layer, wherein said first layer (A) contains at least one organic infrared absorber and at feast one ultraviolet absorber, said second layer (B) contains at least one ultraviolet absorber and is substantially free of organic infrared absorbers, said first layer (A) is the only layer in the multi-layer structure that contains an organic infrared absorber, said third layer (C) is transparent, is free of organic infrared absorber and ultraviolet absorber, and comprises a thermoplastic polymer, and said first layer (A) abuts said second layer (B), and said first layer (A) is interposed between said third layer (C) and said second layer (B).

* * * * *

UNITED STATES PATENT AND TRADEMARK OFFICE
CERTIFICATE OF CORRECTION

PATENT NO. : 6,893,689 B2
DATED : May 17, 2005
INVENTOR(S) : Martin Döbler et al.

It is certified that error appears in the above-identified patent and that said Letters Patent is hereby corrected as shown below:

Column 15,
Line 41, replace "end" with -- and --.

Signed and Sealed this

Second Day of August, 2005

JON W. DUDAS
*Director of the United States Patent and Trademark Office*